United States Patent
Zhang et al.

(10) Patent No.: US 11,955,823 B2
(45) Date of Patent: Apr. 9, 2024

(54) PROTECTING A BATTERY IN A BATTERY PACK

(71) Applicant: O2Micro Inc., Santa Clara, CA (US)

(72) Inventors: Deman Zhang, Shanghai (CN); Yalei Meng, Shanghai (CN)

(73) Assignee: O2Micro Inc., Santa Clara, CA (US)

( * ) Notice: Subject to any disclaimer, the term of this patent is extended or adjusted under 35 U.S.C. 154(b) by 433 days.

(21) Appl. No.: 17/470,931

(22) Filed: Sep. 9, 2021

(65) Prior Publication Data

US 2022/0085630 A1 Mar. 17, 2022

(51) Int. Cl.
*H02J 7/00* (2006.01)

(52) U.S. Cl.
CPC ...... *H02J 7/00302* (2020.01); *H02J 7/00308* (2020.01); *H02J 7/00716* (2020.01); *H02J 2310/22* (2020.01)

(58) Field of Classification Search
CPC .................................................. H02J 7/00302
USPC .................................................. 320/134, 136
See application file for complete search history.

(56) References Cited

U.S. PATENT DOCUMENTS

| | | | |
|---|---|---|---|
| 8,248,261 B1 | 8/2012 | Stell | |
| 10,797,493 B2 | 10/2020 | Liu et al. | |
| 2011/0089906 A1* | 4/2011 | Sakurai | H02J 7/0031 320/134 |
| 2013/0154564 A1* | 6/2013 | Goto | H01M 10/48 320/112 |
| 2013/0229151 A1* | 9/2013 | Okada | H01M 50/569 320/112 |
| 2014/0239896 A1* | 8/2014 | Takeshita | H02J 7/00302 320/117 |
| 2016/0093921 A1* | 3/2016 | Kadirvel | H02J 7/00308 429/61 |
| 2018/0183247 A1* | 6/2018 | Yamauchi | H02J 7/0031 |
| 2019/0280341 A1* | 9/2019 | Li | H02H 3/05 |

FOREIGN PATENT DOCUMENTS

| | | |
|---|---|---|
| CN | 104779589 A | 7/2015 |
| CN | 104868898 A | 8/2015 |
| CN | 208589506 U | 3/2019 |
| CN | 110365074 A | 10/2019 |
| EP | 3361599 A2 | 8/2018 |
| JP | 2019161721 A | 9/2019 |
| KR | 20130104813 A | 9/2013 |

\* cited by examiner

*Primary Examiner* — Edward Tso
*Assistant Examiner* — Ahmed H Omar

(57) ABSTRACT

In a portable device, a load module includes a discharge switch for discharging a battery pack, and a detection circuit that detects a protection signal to control the discharge switch. A charge module includes a charge switch for charging the battery pack, and a detection circuit that detects the protection signal to control the charge switch. The battery pack includes a protection terminal that provides the protection signal, and protection circuitry that sets the protection signal to a state according to the battery pack's status. The protection signal turns the charge switch on and the discharge switch off if the protection signal is in a first state, turns the charge switch off and the discharge switch on if it's in a second state, turns the charge and discharge switches off if it's in a third state, and turns the charge and discharge switches on if it's in a fourth state.

20 Claims, 9 Drawing Sheets

PROTECTING A BATTERY IN A BATTERY PACK

REFERENCE TO RELATED APPLICATION

This application claims benefit under 35 U.S.C. § 119(a) to Application No. 202010961260.0, filed with the State Intellectual Property Office of the People's Republic of China on Sep. 14, 2020, hereby incorporated herein by reference in its entirety.

BACKGROUND

FIG. 1 illustrates a block diagram of a conventional portable device 100. As shown in FIG. 1, the portable device 100 includes a battery pack 102, a load module 104, and a charger module 106. The battery pack 102 includes a battery 122, protection circuitry 108, and protection pins 110 and 112. The protection circuitry 108 generates protection signals $S_{PR1}$ and $S_{PR2}$ according to a status of the battery 122, and the protection pins 110 and 112 provide the protection signals $S_{PR1}$ and $S_{PR2}$ to the load module 104 and the charger module 106, respectively, thereby protecting the battery 122. The charger module 106 includes a charge switch $Q_{CHG}$, and the load module 104 includes a discharge switch $Q_{DSG}$. Thus, the battery pack 102 does not include a charge switch and a discharge switch. In addition, the charger module 106 includes a charger circuit 120 and a detection circuit 118. The charger circuit 120 receives input power from an external power source 130, converts the input power to a charging current, and delivers the charging current to charge the battery 122 through the charge switch $Q_{CHG}$. The detection circuit 118 detects the protection signal $S_{PR2}$ at the protection pin 112 to determine whether an over-voltage condition is present in the battery 122. If the detection circuit 118 detects an over-voltage condition in the battery 122, then the detection circuit 118 turns off the charge switch $Q_{CHG}$, thereby protecting the battery 122. Similarly, the load module 104 includes a load circuit 116 and a detection circuit 114. The load circuit 116 can be powered by the battery 122. More specifically, a discharging current of the battery 122 can flow to the load circuit 116 through the discharge switch $Q_{DSG}$. The detection circuit 114 detects the protection signal $S_{PR1}$ at the protection pin 110 to determine whether an under-voltage condition is present in the battery 122. If the detection circuit 118 detects an under-voltage condition in the battery 122, then the detection circuit 118 turns off the discharge switch $Q_{DSG}$, thereby protecting the battery 122.

However, the battery pack 102 in the conventional portable device 100 uses two protection pins 110 and 112 to protect the battery 122, which increases the size and the cost of the battery pack 102.

SUMMARY

In embodiments, a portable device includes a load module, a charge module, and a battery pack coupled to the load module and the charge module. The load module includes a discharge switch configured to allow a discharging current of a battery to flow through it to power the load module, and a first detection circuit configured to detect a protection signal thereby controlling the discharge switch based on the protection signal. The charge module includes a charge switch configured to allow a charging current to flow through it to charge the battery, and a second detection circuit configured to detect the protection signal thereby controlling the charge switch based on the protection signal. The battery pack includes the battery. The battery pack also includes a protection terminal and protection circuitry coupled to the protection terminal. The protection terminal provides the protection signal to protect the battery. The protection circuitry sets the protection signal to a state of a set of states according to a status of the battery, thereby controlling the charge switch and the discharge switch. The set of states include a first state, a second state, a third state, and a fourth state. The protection signal, if in the first state, causes the charge switch to be turned on and the discharge switch to be turned off. The protection signal, if in the second state, causes the charge switch to be turned off and the discharge switch to be turned on. The protection signal, if in the third state, causes the charge switch to be turned off and the discharge switch to be turned off. The protection signal, if in the fourth state, causes the charge switch to be turned on and the discharge switch to be turned on.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
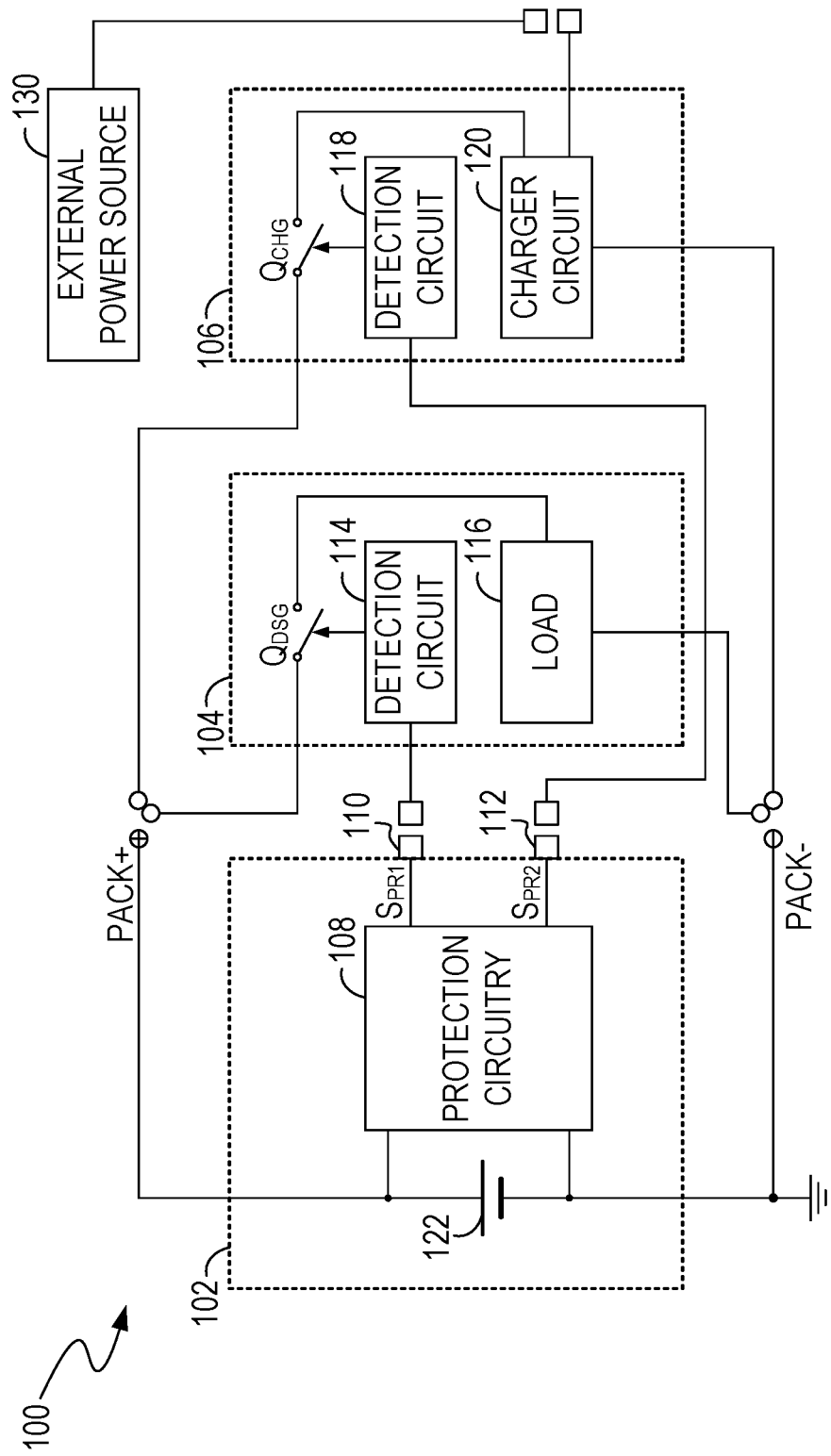
FIG. 1 illustrates a block diagram of a conventional portable device.
Figure 2:
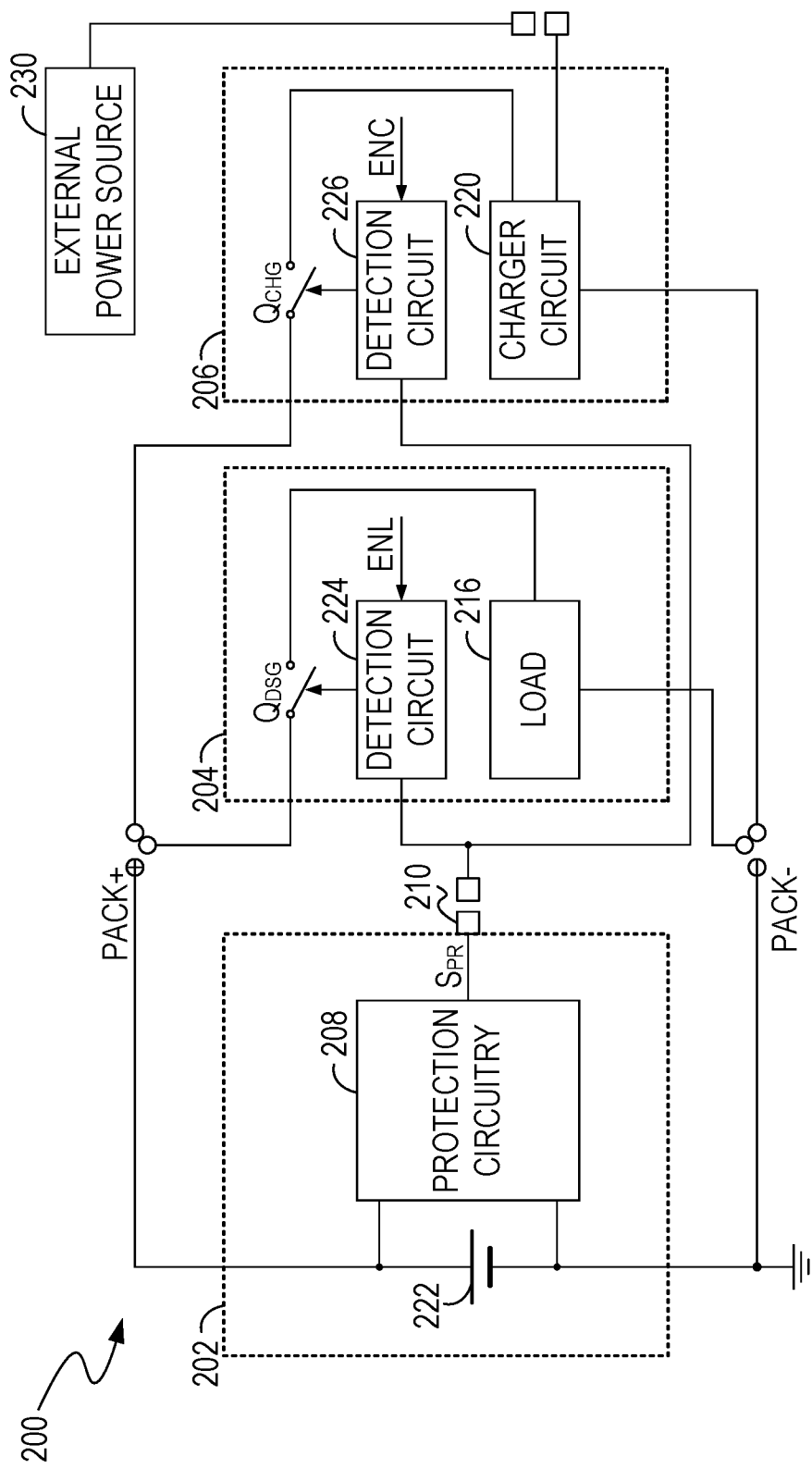
FIG. 2 illustrates a block diagram of an example of a portable device, in an embodiment of the present invention.

FIG. 2 illustrates a block diagram of an example of a portable device 200, in an embodiment of the present invention. The portable device 200 may be or can include a power tool, an electric bicycle (E-bike), an electric motor (E-motor), a garden tool, a vacuum cleaner, an electric scooter (E-scooter), or the like. As shown in FIG. 2, the portable device 200 includes a battery pack 202, a load module 204, and a charger module 206. The battery pack 202 includes a battery 222, protection circuitry 208, and a protection terminal 210 (or protection pin 210). The battery 222 may be a rechargeable battery. The load module 204 includes a load circuit 216, a detection circuit 224, and a discharge switch $Q_{DSG}$. The charger module 206 includes a charger circuit 220, a detection circuit 226, and a charge switch $Q_{CHG}$. In an embodiment, the load module 204 and the charger module 206 protect the battery 222 by detecting the protection signal $S_{PR}$ at the protection terminal 210. Compared with the conventional battery pack 102, the battery pack 202 in an embodiment according to the present invention uses fewer pins, e.g., one pin, to provide protection to the battery 222. Thus, compared with the conventional battery pack 102, the size and the cost of the battery pack 202 are reduced.

More specifically, in an embodiment, the discharge switch $Q_{DSG}$ in the load module 204 can allow a discharging current of the battery 222 to flow through it to power the load circuit 216. The detection circuit 224 can detect a protection signal $S_{PR}$ at the protection terminal 210, thereby controlling the discharge switch $Q_{DSG}$ based on the protection signal $S_{PR}$. The charge switch $Q_{CHG}$ in the charger module 206 can allow a charging current from the charger circuit 220 to flow through it to charge the battery 222. The detection circuit 226 can detect the protection signal $S_{PR}$ at the protection terminal 210, thereby controlling the charge switch $Q_{CHG}$ based on the protection signal $S_{PR}$. The protection terminal 210 of the battery pack 202 can provide the protection signal $S_{PR}$ to protect the battery 222. The protection circuitry 208 can set the protection signal $S_{PR}$ to a state of a set of states according to a status/condition of the battery 222 (e.g., including a normal condition, an over-voltage condition, an under-voltage condition, an over-temperature condition, etc.), thereby controlling the charge switch $Q_{CHG}$ and the discharge switch $Q_{DSG}$.

In an embodiment, the abovementioned set of states include a first state, a second state, a third state, and a fourth state. The protection signal $S_{PR}$ can turn on the charge switch $Q_{CHG}$ and turn off the discharge switch $Q_{DSG}$ if it is in the first state. The protection signal $S_{PR}$ can turn off the charge switch $Q_{CHG}$ and turn on the discharge switch $Q_{DSG}$ if it is in the second state. The protection signal $S_{PR}$ can turn off the charge switch $Q_{CHG}$ and the discharge switch $Q_{DSG}$ if it is in the third state. The protection signal $S_{PR}$ can turn on the charge switch $Q_{CHG}$ and the discharge switch $Q_{DSG}$ if it is in the fourth state. In an embodiment, if the protection circuitry 208 detects an over-voltage condition in the battery 222, then the protection circuitry 208 sets the protection signal $S_{PR}$ to the third state or the second state, thereby turning off the charge switch $Q_{CHG}$. If the protection circuitry 208 detects an under-voltage condition in the battery 222, then the protection circuitry 208 sets the protection signal $S_{PR}$ to the third state or the first state, thereby turning off the discharge switch $Q_{DSG}$.

In an embodiment, the protection signal $S_{PR}$ includes a voltage signal, and can have multiple voltage levels respectively corresponding to multiple conditions of the battery 222, e.g., including a normal condition, an over-voltage condition, an under-voltage condition, an over-temperature condition, etc. For example, if the battery 222 is charged by an external power source 230, e.g., an adapter, and the battery 222 is in a normal condition, then the protection circuitry 208 can set the protection signal $S_{PR}$ to be at a voltage level corresponding to the above-mentioned fourth state. If the battery 222 is fully charged or is in an over-voltage condition, then the protection circuitry 208 can set the protection signal $S_{PR}$ to be at a voltage level corresponding to the above-mentioned second state. If the load module 204 enters a sleeping mode (or a shutdown mode) during a charging process of the battery 222, then the protection circuitry 208 can set the protection signal $S_{PR}$ to be at a voltage level corresponding to the above-mentioned first state. If the battery 222 is in an over-temperature condition, then the protection circuitry 208 can set the protection signal $S_{PR}$ to be at a voltage level corresponding to the above-mentioned third state. For another example, if there is no external power source charging the battery 222, and the battery 222 is in a normal discharging process (e.g., the battery 222 is in a normal condition when it is supplying power to the load module 204), then the protection circuitry 208 can set the protection signal $S_{PR}$ to be at a voltage level corresponding to the second state. If the battery 222 is in an under-voltage condition, then the protection circuitry 208 can set the protection signal $S_{PR}$ to be at a voltage level corresponding to the third state. Thus, in an embodiment, the protection signal $S_{PR}$ includes a voltage signal, and can have multiple voltage levels. However, the invention is not so limited. In another embodiment, the protection signal $S_{PR}$ includes a frequency signal, and can have multiple frequencies respectively corresponding to multiple conditions of the battery 222.

Figure 3A:
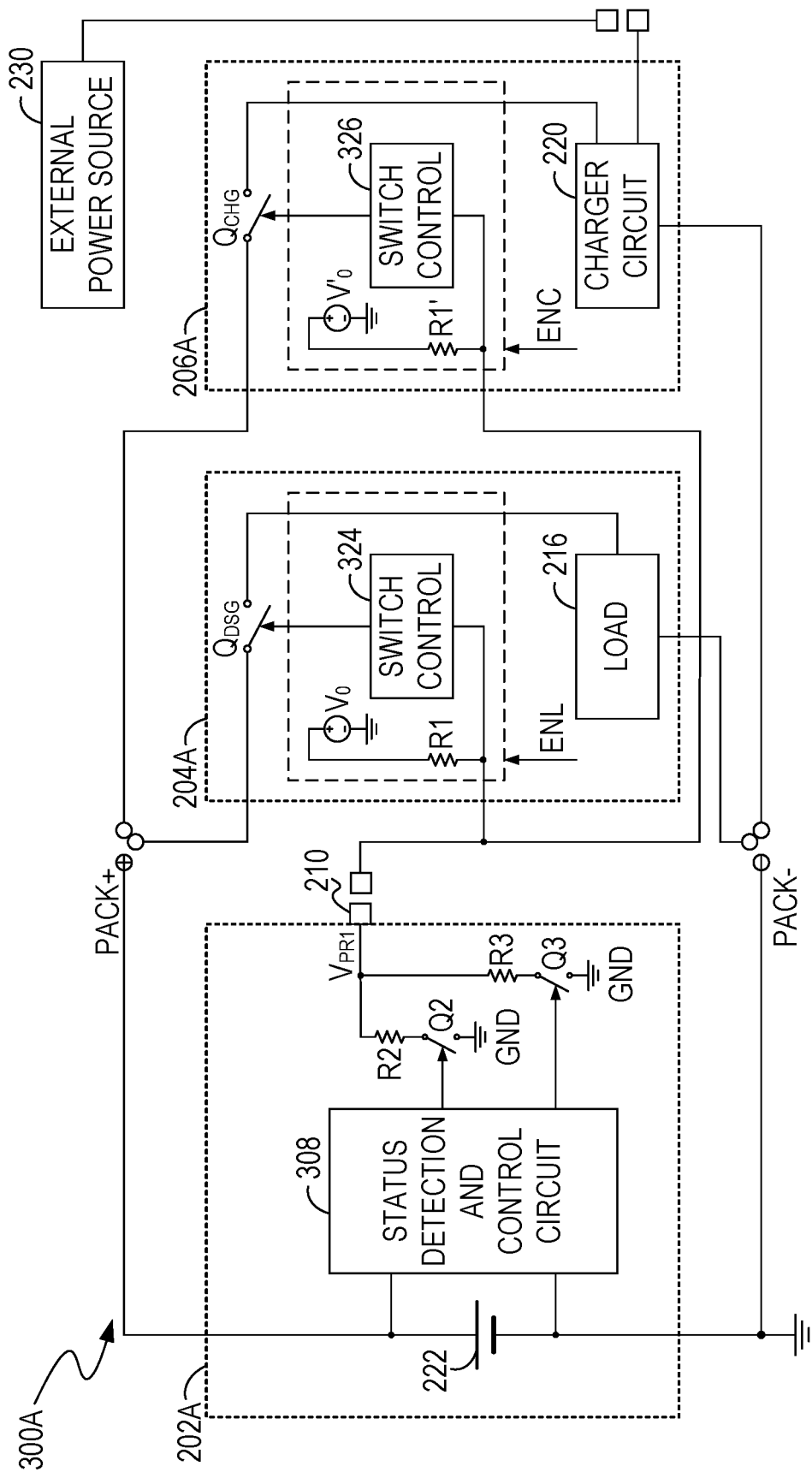
FIG. 3A illustrates a circuit diagram of an example of a portable device, in an embodiment of the present invention.

FIG. 3A illustrates a circuit diagram of an example of a portable device 300A, in an embodiment of the present invention. The battery pack 202A, load module 204A, and charger module 206A in FIG. 3A can be examples of the battery pack 202, load module 204, and charger module 206 in FIG. 2. FIG. 3A is described in combination with FIG. 2.

In the example of FIG. 3A, the protection circuitry in the battery pack 202A includes a first resistor R2, a second resistor R3, a first switch Q2, a second switch Q3, and a status detection and control circuit 308 that controls the first switch Q2 and the second switch Q3 according to a status/condition of the battery 222. The first resistor R2 is coupled to the protection terminal 210. The first switch Q2 can selectively connect the protection terminal 210 to a reference ground GND through the first resistor R2. The second resistor R3 is coupled to the protection terminal 210. The second switch Q3 can selectively connect the protection terminal 210 to the reference ground GND through the second resistor R3. Thus, as shown in FIG. 3A, if the first switch Q2 is turned on and the second switch Q3 is turned off, then the resistance at the protection terminal 210 can be R2; if the first switch Q2 is turned off and the second switch Q3 is turned on, then the resistance at the protection terminal 210 can be R3; if the first switch Q2 and the second switch Q3 are turned on, then the resistors R2 and R3 are coupled in parallel, and therefore the resistance at the protection terminal 210 can be R2∥R3, e.g., (R2×R3)/(R2+R3); or if the first switch Q2 and the second switch Q3 are turned off, then the protection terminal 210 is in an open state (or a floating state, a high-impedance state, etc.). Additionally, the first resistor R2 and the second resistor R3 have different resistance values. Thus, by controlling the switches Q2 and Q3, the control circuit 308 can control the protection terminal 210 to have four different resistance states, including R2, R3, R2∥R3, and an open state, e.g., corresponding to the abovementioned first, second, third, and fourth states.

In an embodiment, the detection circuit 224 in the load module 204 of FIG. 2 can include a first reference power source that applies electric power to the protection terminal 210, and a first switch control circuit that controls the discharge switch $Q_{DSG}$ according to the state of the protection signal $S_{PR}$. Similarly, the detection circuit 226 in the charger module 206 of FIG. 2 can include a second reference power source that applies electric power to the protection terminal 210, and a second switch control circuit that controls the charge switch $Q_{CHG}$ according to the state of the protection signal $S_{PR}$. If an external power source 230, e.g., an adapter, is connected to the portable device 200, then the portable device 200 can disable the first reference power source and enable the second reference power source. If there is no external power source connected to the portable device 200, then the portable device 200 can enable the first reference power source and disable the second reference power source.

Taking FIG. 3A as an example, the first reference power source in the load module 204A includes a first voltage source $V_0$ coupled to the protection terminal 210 through a third resistor R1. The second reference power source in the charger module 206A includes a second voltage source $V_0'$ coupled to the protection terminal 210 through a fourth resistor R1'. The first voltage source $V_0$ can be enabled or disabled by a signal ENL. The second voltage source $V_0'$ can be enabled or disabled by a signal ENC. The portable device 300A can include a power source detection circuit (not shown in FIG. 3A) that detects whether an external power source 230 is connected to the portable device 300A, and controls the signal ENL and/or the signal ENC according to a result of the detection. More specifically, in an embodiment, if an external power source 230 is connected to the portable device 300A, then the portable device 300A generates a disable signal ENL to disable the first voltage source $V_0$, and generates an enable signal ENC to enable the second voltage sources $V_0'$. If there is no external power source connected to the portable device 300A, then the portable device 300A generates an enable signal ENL to enable the first voltage source $V_0$, and generates a disable signal ENC to disable the second voltage source $V_0'$.

In the example of FIG. 3A, by controlling the switches Q2 and Q3 in the battery pack 202A, the protection terminal 210 can have four different resistance states. Thus, when the voltage source $V_0$ or the voltage source $V_0'$ is enabled, by controlling the switches Q2 and Q3, a voltage signal $V_{PR1}$ at the protection terminal 210 can have four different voltage levels. In this example, the abovementioned protection signal $S_{PR}$ includes the voltage signal $V_{PR1}$. In an embodiment, when there is no external power source connected to the portable device 300A, the voltage source $V_0$ is enabled and the voltage source $V_0'$ is disabled. If the switch Q2 is on and the switch Q3 is off, then the voltage signal $V_{PR1}$ can be at a voltage level V1, e.g., $V1=(V_0 \times R2)/(R1+R2)$; if the switch Q2 is off and the switch Q3 is on, then the voltage signal $V_{PR1}$ can be at a voltage level V2, e.g., $V2=(V_0 \times R3)/(R1+R3)$; if the switch Q2 is on and the switch Q3 is on, then the voltage signal $V_{PR1}$ can be at a voltage level V3, e.g., $V3=[V_0 \times (R2\|R3)]/[R1\pm(R2\|R2)]$; or if the switch Q2 is off and the switch Q3 is off, then the voltage signal $V_{PR1}$ can be at the voltage level of $V_0$ provided by the first voltage source $V_0$. Similarly, when the external power source 230 is connected to the portable device 300A, the voltage source $V_0'$ is enabled and the voltage source $V_0$ is disabled. If the switch Q2 is on and the switch Q3 is off, then the voltage signal $V_{PR1}$ can be at a voltage level V1', e.g., $V1'=(V_0' \times R2)/(R1+R2)$; if the switch Q2 is off and the switch Q3 is on, then the voltage signal $V_{PR1}$ can be at a voltage level V2', e.g., $V2'=(V_0' \times R3)/(R1+R3)$; if the switch Q2 is on and the switch Q3 is on, then the voltage signal $V_{PR1}$ can be at a voltage level V3', e.g., $V3'=[V_0'(R2\|R3)]/[R1\pm(R2\|R2)]$; or if the switch Q2 is off and the switch Q3 is off, then the voltage signal $V_{PR1}$ can be at the voltage level $V_0'$ provided by the second voltage source $V_0'$. Because the resistance R2 is not equal to the resistance R3, the voltage levels V1, V2, V3 and $V_0$ are not equal to each other, and the voltage levels V1', V2', V3' and $V_0'$ are not equal to each other. Accordingly, the switch control circuit 324 in the load module 204A can control the discharge switch $Q_{DSG}$ according to the voltage level $V_{PR1}$ at the protection terminal 210, and the switch control circuit 326 in the charger module 206A can control the charge switch $Q_{CHG}$ according to the voltage level $V_{PR1}$ at the protection terminal 210. For example, when the voltage source $V_0$ is enabled and the voltage source $V_0'$ is disabled, if the voltage level at the protection terminal 210 is V1 or V3, then the switch control circuit 324 turns on the discharge switch $Q_{DSG}$; or if the voltage level at the protection terminal 210 is V2 or $V_0$, then the switch control circuit 324 turns off the discharge switch $Q_{DSG}$. For another example, when the voltage source $V_0'$ is enabled and the voltage source $V_0$ is disabled, if the voltage level at the protection terminal 210 is V2' or V3', then the switch control circuit 326 turns on the charge switch $Q_{CHG}$; or if the voltage level at the protection terminal 210 is V1' or $V_0'$, then the switch control circuit 326 turns off the charge switch $Q_{CHG}$.

Accordingly, in an embodiment of the present invention, the control circuit 308 in the battery pack 202A can control the switches Q2 and Q3, thereby generating a protection signal $V_{PR1}$ at a terminal 210 (or a pin) that can control not only the discharge switch $Q_{DSG}$ in the load module 204A but also the charge switch $Q_{CHG}$ in the charger module 206A. Thus, the battery pack 202A in an embodiment of the present invention can include fewer pins, e.g., only one pin, compared with the conventional battery pack 102.

In some embodiments, the voltages provided by the voltage sources $V_0$ and $V_0'$ can be the same or different, and the resistances of the third resistor R1 and the fourth resistor R1' can be the same or different. For example, the switch control circuit 324 in the load module 204A can be enabled when the voltage source $V_0$ is enabled, or disabled when the voltage source $V_0$ is disabled. Similarly, the switch control circuit 326 in the charger module 206A can be enabled when the voltage source $V_0'$ is enabled, or disabled when the voltage source $V_0'$ is disabled. Hence, the switch control circuits 324 and 326 can work whether the voltage sources $V_0$ and $V_0'$ provide the same or different voltages, and whether the third resistor R1 and the fourth resistor R1' have the same or different resistances. For another example, the switch control circuit 324 in the load module 204A and the switch control circuit 326 in the charger module 206A can operate in parallel. If an external power source 230 is connected to the portable device 300A, then the voltage source $V_0'$ is enabled, the voltage source $V_0$ is disabled, and the switch control circuits 324 and 326 are enabled to detect the protection signal $V_{PR1}$ at the protection terminal 210. In this example, the voltage sources $V_0$ and $V_0'$ can be selected such that they provide the same voltages, e.g., $V_0=V_0'$, and the third resistor R1 and the fourth resistor R1' can be selected such that they have the same the resistance (e.g., R1=R1'), thereby simplifying a circuit design of a detection circuit in the switch control circuit 324 that detects the protection signal $V_{PR1}$. That may also reduce the size of the PCB (printed circuit board) and the cost of the switch control circuit 324.

Figure 3B:
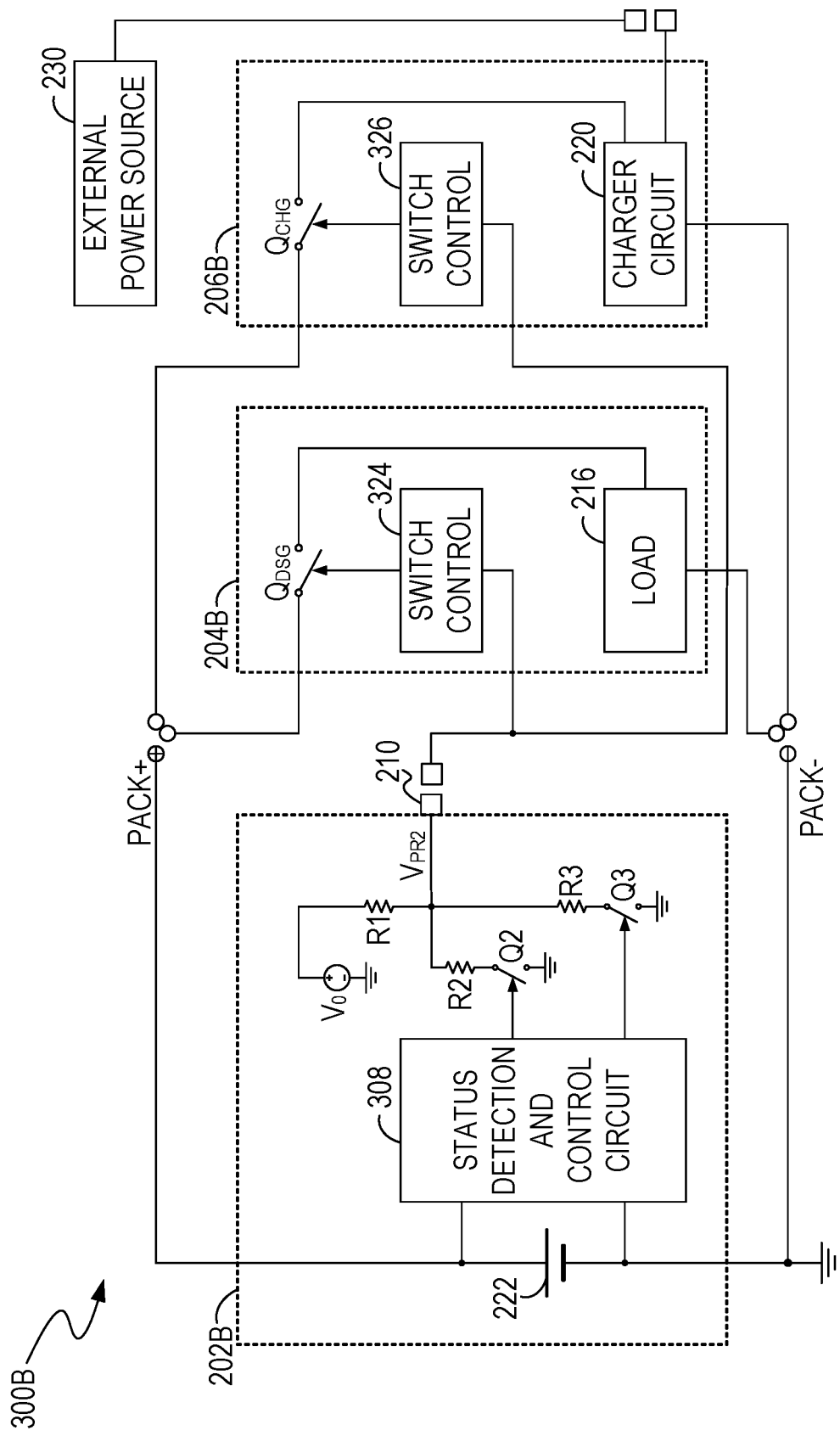
FIG. 3B illustrates a circuit diagram of an example of a portable device, in an embodiment of the present invention.

FIG. 3B illustrates a circuit diagram of an example of a portable device 300B, in another embodiment of the present invention. The battery pack 202B, load module 204B, and charger module 206B in FIG. 3B can be examples of the battery pack 202, load module 204, and charger module 206 in FIG. 2. In the example of FIG. 3B, the circuit structure of the portable device 300B is similar to the circuit structure of the above-mentioned portable device 300A, except the battery pack 202B in the portable device 300B includes a reference voltage source $V_0$ and a third resistor R1, and the voltage sources $V_0$ and $V_0'$ and the resistors R1 and R1' shown in FIG. 3A are omitted in the load module 204B and the charger module 206B in FIG. 3B. FIG. 3B is described in combination with FIG. 2 and FIG. 3A.

More specifically, in the example of FIG. 3B, the protection circuitry in the battery pack 202B includes a reference voltage source $V_0$ that applies electric power to the protection terminal 210, and a third resistor R1 coupled between the reference voltage source $V_0$ and the protection terminal 210. As mentioned above, by controlling the switches Q2 and Q3, the protection terminal 210 can have four different resistance states, and therefore a voltage signal $V_{PR2}$ at the protection terminal 210 can have four different voltage levels, e.g., including the above-mentioned V1, V2, V3, and $V_0$. The switch control circuits 324 and 326 can control the charge switch $Q_{CHG}$ and the discharge switch $Q_{DSG}$ according to the status of the voltage signal $V_{PR2}$, thereby protecting the battery 222.

Figure 4A:
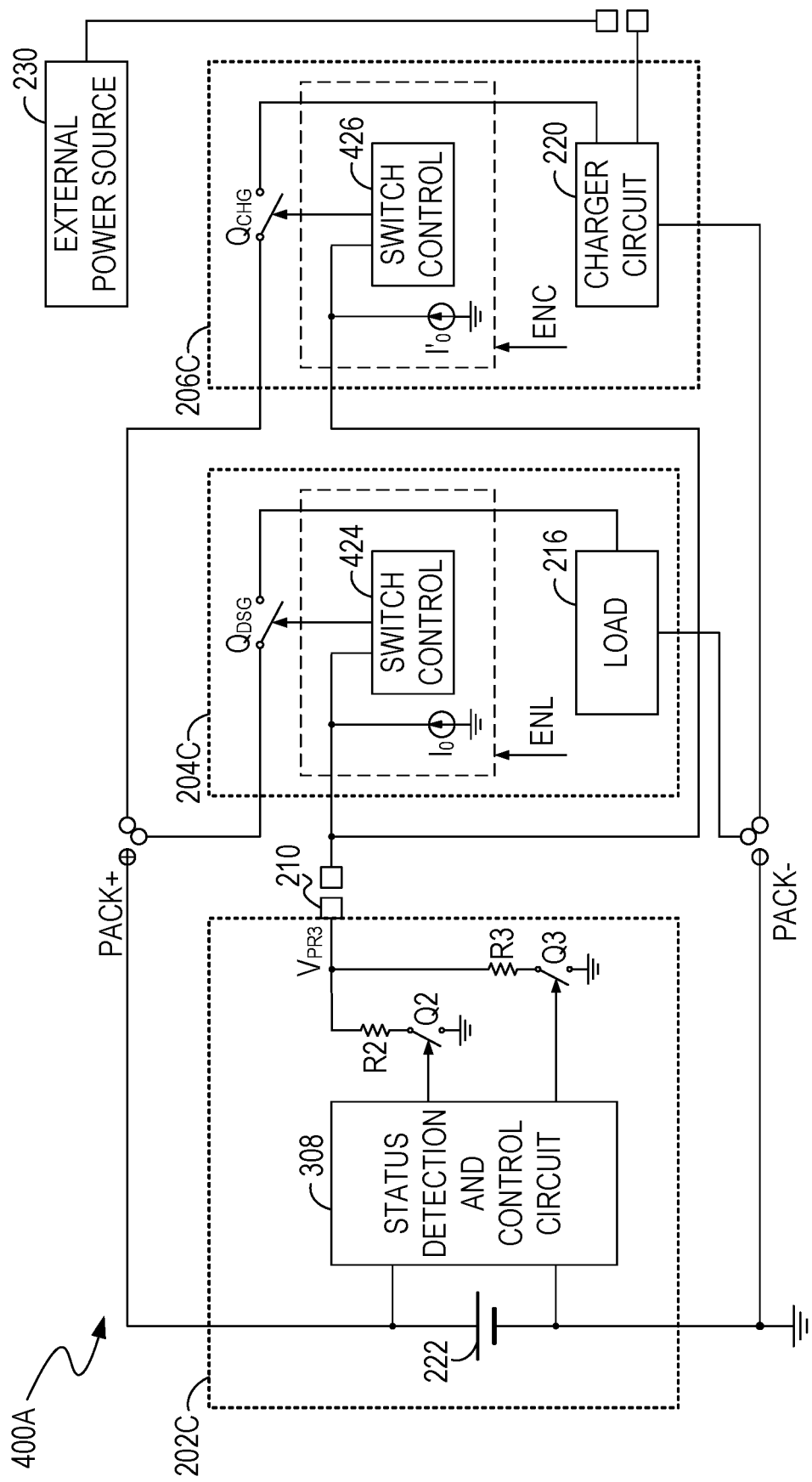
FIG. 4A illustrates a circuit diagram of an example of a portable device, in an embodiment of the present invention.

FIG. 4A illustrates a circuit diagram of an example of a portable device 400A, in another embodiment of the present invention. The battery pack 202C, load module 204C, and charger module 206C in FIG. 4A can be examples of the battery pack 202, load module 204, and charger module 206 in FIG. 2. In the example of FIG. 4A, the circuit structure of the portable device 400A is similar to the circuit structure of the above-mentioned portable device 300A, except that in the portable device 400A, the load module 204C includes a first current source $I_0$ instead of the first voltage source $V_0$ and the third resistor R1, and the charger module 206C includes a second current source $I_0'$ instead of the second voltage source $V_0'$ and the fourth resistor R1'. FIG. 4A is described in combination with FIG. 2 and FIG. 3A.

In the example of FIG. 4A, the abovementioned first reference power source includes a first current source $I_0$, and the abovementioned second reference power source includes a second current source $I_0'$. When the current source $I_0$ or the current source $I_0'$ is enabled, by controlling the switches Q2 and Q3, a voltage signal $V_{PR3}$ at the protection terminal 210 can have four different voltage levels. In this example, the abovementioned protection signal $S_{PR}$ includes the voltage signal $V_{PR3}$. In an embodiment, when there is no external power source connected to the portable device 400A, the current source $I_0$ is enabled and the current source $I_0'$ is disabled. If the switch Q2 is on and the switch Q3 is off, then the voltage signal $V_{PR3}$ can be at a voltage level V5, e.g., $V5=I_0 \times R2$; if the switch Q2 is off and the switch Q3 is on, then the voltage signal $V_{PR3}$ can be at a voltage level V6, e.g., $V6=I_0 \times R3$; if the switch Q2 is on and the switch Q3 is on, then the voltage signal $V_{PR3}$ can be at a voltage level V7, e.g., $V7=I_0 \times (R2 \| R3)$; or if the switch Q2 is off and the switch Q3 is off, then the voltage signal $V_{PR3}$ can be at a voltage level V8 determined by the circuit parameters of the current source $I_0$. Similarly, when an external power source 230 is connected to the portable device 400A, the current source $I_0'$ is enabled and the current source $I_0$ is disabled. If the switch Q2 is on and the switch Q3 is off, then the voltage signal $V_{PR3}$ can be at a voltage level V5', e.g., $V5'=I_0' \times R2$; if the switch Q2 is off and the switch Q3 is on, then the voltage signal $V_{PR3}$ can be at a voltage level V6', e.g., $V6'=I_0' \cdot R3$; if switch Q2 is on and switch Q3 is on, then the voltage signal $V_{PR3}$ can be at a voltage level V7', e.g., $V7'=I_0' \times (R2 \| R3)$; or if switch Q2 is off and the switch Q3 is off, then the voltage signal $V_{PR3}$ can be at a voltage level V8' determined by the circuit parameters of the current source $I_0'$. The voltage levels V5, V6, V7 and V8 are not equal to each other, and the voltage levels V5', V6', V7' and V8' are not equal to each other. Accordingly, the switch control circuit 424 in the load module 204C can control the discharge switch $Q_{DSG}$ according to the voltage level $V_{PR3}$ at the protection terminal 210, and the switch control circuit 426 in the charger module 206C can control the charge switch $Q_{CHG}$ according to the voltage level $V_{PR3}$ at the protection terminal 210. For example, when the current source $I_0$ is enabled and the current source $I_0'$ is disabled, if the voltage level at the protection terminal 210 is V5 or V7, then the switch control circuit 424 turns on the discharge switch $Q_{DSG}$; or if the voltage level at the protection terminal 210 is V6 or V8, then the switch control circuit 424 turns off the discharge switch $Q_{DSG}$. For another example, when the current source $I_0'$ is enabled and the current source $I_0$ is disabled, if the voltage level at the protection terminal 210 is V6' or V7', then the switch control circuit 426 turns on the charge switch $Q_{CHG}$; or if the voltage level at the protection terminal 210 is V5' or V8', then the switch control circuit 426 turns off the charge switch $Q_{CHG}$.

Accordingly, in an embodiment of the present invention, the control circuit 308 in the battery pack 202C can control the switches Q2 and Q3, thereby generating a protection signal $V_{PR3}$ at a terminal 210 (or a pin) that can control not only the discharge switch $Q_{DSG}$ in the load module 204C but also the charge switch $Q_{CHG}$ in the charger module 206C. Thus, the battery pack 202C in an embodiment of the present invention can include fewer pins, e.g., only one pin, compared with the conventional battery pack 102.

In some embodiments, the currents provided by the current sources $I_0$ and $I_0'$ can be the same or different. For example, the switch control circuit 424 in the load module 204C can be enabled when the current source $I_0$ is enabled, or disabled when the current source $I_0$ is disabled. Similarly, the switch control circuit 426 in the charger module 206C can be enabled if the current source $I_0'$ is enabled, or disabled when the current source $I_0'$ is disabled. Hence, the switch control circuits 424 and 426 can work whether the current sources $I_0$ and $I_0'$ provide the same or different currents. In another example, the switch control circuit 424 in the load module 204C and the switch control circuit 426 in the charger module 206C can work in parallel. If an external power source 230 is connected to the portable device 400A, then the current source $I_0'$ is enabled, the current source $I_0$ is disabled, and the switch control circuits 424 and 426 are enabled to detect the protection signal $V_{PR3}$ at the protection terminal 210. In this example, the current sources $I_0$ and $I_0'$ can be selected such that they provide the same currents, e.g., $I_0=I_0'$, thereby simplifying a circuit design of a detection circuit in the switch control circuit 424 that detects the protection signal $V_{PR3}$. That may also reduce the size of the PCB (printed circuit board) and the cost of the switch control circuit 424.

Figure 4B:
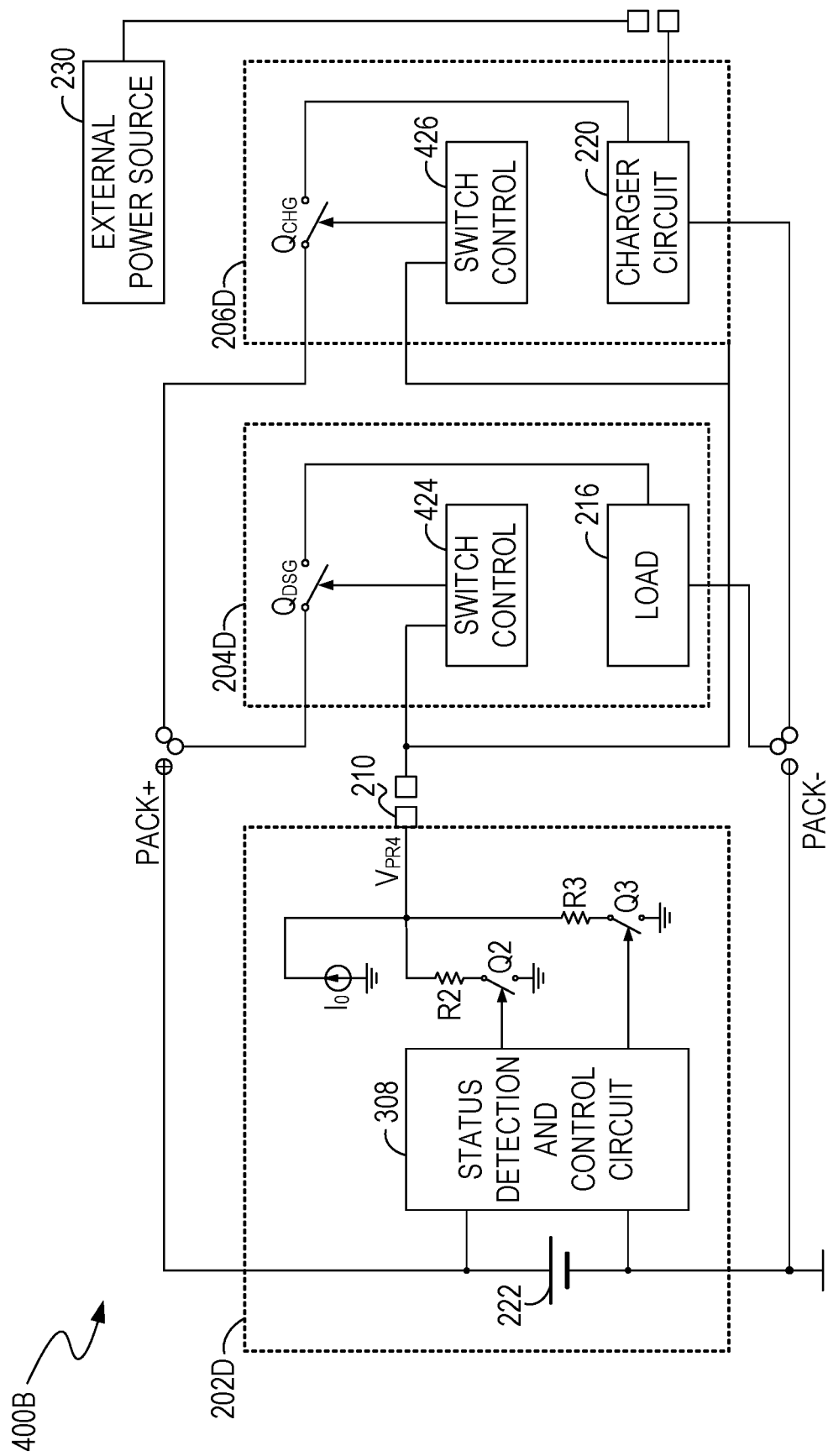
FIG. 4B illustrates a circuit diagram of an example of a portable device, in an embodiment of the present invention.

FIG. 4B illustrates a circuit diagram of an example of a portable device 400B, in another embodiment of the present invention. The battery pack 202D, load module 204D, and charger module 206D in FIG. 4B can be examples of the battery pack 202, load module 204, and charger module 206 in FIG. 2. In the example of FIG. 4B, the circuit structure of the portable device 400B is similar to the circuit structure of the above-mentioned portable device 400A except the battery pack 202D in the portable device 400B includes a reference current source $I_0$, and the current sources $I_0$ and $I_0'$ are omitted in the load module 204D and the charger module 206D in FIG. 4B. FIG. 4B is described in combination with FIG. 2 and FIG. 4A.

More specifically, in the example of FIG. 4B, the protection circuitry in the battery pack 202D includes a reference current source $I_0$ that applies electric power to the protection terminal 210. As mentioned above, by controlling the switches Q2 and Q3, the protection terminal 210 can have four different resistance states, and therefore the voltage signal $V_{PR4}$ at the protection terminal 210 can have four different voltage levels, e.g., including the above-mentioned V5, V6, V7, and V8. The switch control circuits 424 and 426 control the charge switch $Q_{CHG}$ and the discharge switch $Q_{DSG}$ according to the status of the voltage signal $V_{PR4}$, thereby protecting the battery 222.

Figure 5:
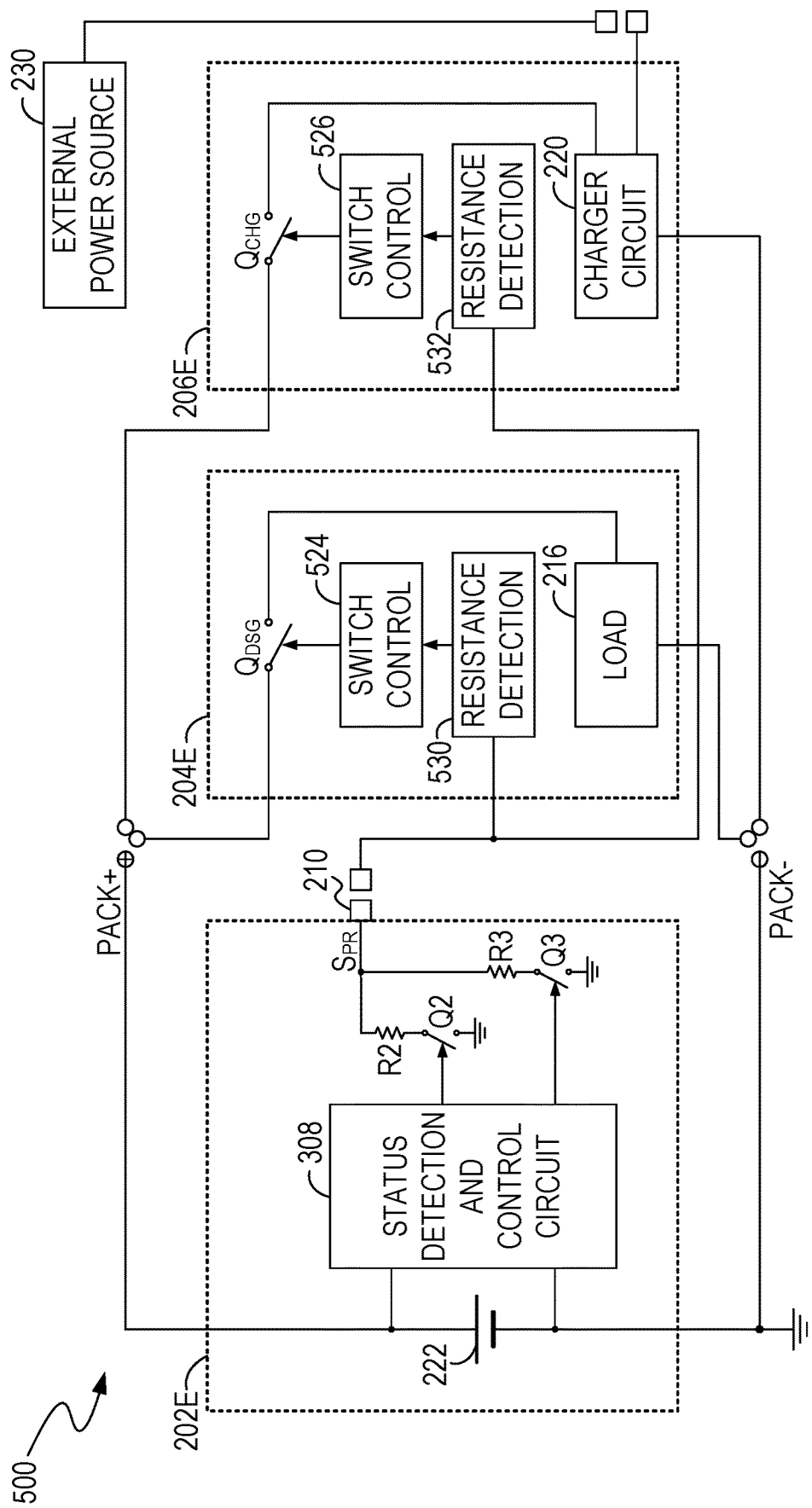
FIG. 5 illustrates a circuit diagram of an example of a portable device, in an embodiment of the present invention.

FIG. 5 illustrates a circuit diagram of an example of a portable device 500, in another embodiment of the present invention. The battery pack 202E, load module 204E, and charger module 206E in FIG. 5 can be examples of the battery pack 202, load module 204, and charger module 206 in FIG. 2. In the example of FIG. 5, the circuit structure of the portable device 500 is similar to the circuit structures of the above-mentioned portable devices 300A and 400A, except that in the portable device 500, the load module 204E includes a resistance detection circuit 530, and the charger module 206E includes a resistance detection circuit 532. FIG. 5 is described in combination with FIG. 2, FIG. 3A, and FIG. 4A.

More specifically, in the example of FIG. 5, the first detection circuit in the load module 204E includes a first resistance detection circuit 530 that detects the resistance at the protection terminal 210, and includes a first switch control circuit 524 that controls the discharge switch $Q_{DSG}$ according to the resistance. Similarly, the second detection circuit in the charger module 206E includes a second resistance detection circuit 532 that detects the resistance at protection terminal 210, and includes a second switch control circuit 526 that controls the charge switch $Q_{CHG}$ according to the resistance. As mentioned above, by controlling the switches Q2 and Q3, the protection terminal 210 can have four different resistance states. Thus, the resistance detection circuits 530 and 532 can determine whether to turn on or off the charge switch $Q_{CHG}$ and/or the discharge switch $Q_{DSG}$ by detecting the resistance at the protection terminal 210.

Although in the embodiments of FIG. 3A, FIG. 3B, FIG. 4A, FIG. 4B and FIG. 5, one end of the first resistor R2 is coupled to the protection terminal 210, the other end of the first resistor R2 is coupled to the reference ground GND through the switch Q2, one end of the second resistor R3 is coupled to the protection terminal 210, and the other end of the second resistor R3 is coupled to the reference ground GND through the switch Q3, the invention is not so limited. In other embodiments, one end of the first resistor R2 can be coupled to the reference ground GND, and the other end of the first resistor R2 can be coupled to the protection terminal 210 through the switch Q2. Similarly, one end of the second resistor R3 can be coupled to the reference ground GND, and the other end of the second resistor R3 can be coupled to the protection end 210 through the switch Q3.

Figure 6:
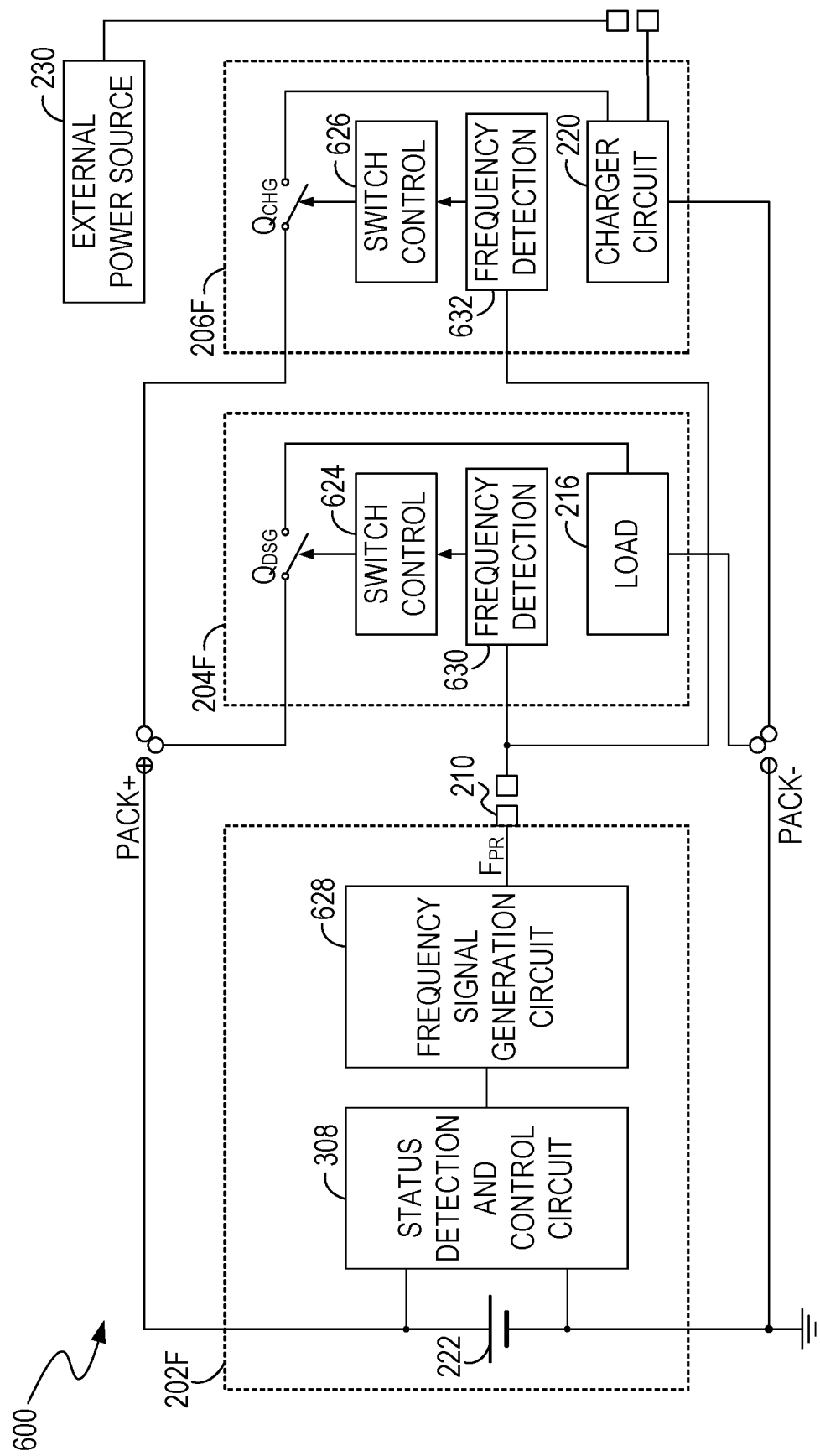
FIG. 6 illustrates a block diagram of an example of a portable device, in an embodiment of the present invention.

FIG. 6 illustrates a block diagram of an example of a portable device 600, in another embodiment of the present invention. The battery pack 202F, load module 204F, and charger module 206F in FIG. 6 can be examples of the battery pack 202, load module 204, and charger module 206 in FIG. 2. In the example of FIG. 6, the circuit structure of the portable device 600 is similar to the circuit structure of the above-mentioned portable devices, except that in the portable device 600, the battery pack 202F includes a frequency signal generator 628, the load module 204F includes a frequency detection circuit 630, and the charger module 206F includes a frequency detection circuit 632. FIG. 6 is described in combination with FIG. 2, FIG. 3A, FIG. 3B, FIG. 4A, FIG. 4B, and FIG. 5.

In the example of FIG. 6, the protection circuitry in the battery pack 202F includes a frequency signal generator 628 that generates a frequency signal $F_{PR}$, and that controls the frequency signal $F_{PR}$ to be at a frequency level of multiple frequency levels according to a status of the battery 222. In this example, the abovementioned protection signal $S_{PR}$ includes the frequency signal $F_{PR}$. The multiple frequency levels can include four different frequency levels, respectively corresponding to the abovementioned first state, second state, third state, and fourth state of the protection signal $S_{PR}$.

Figure 7:
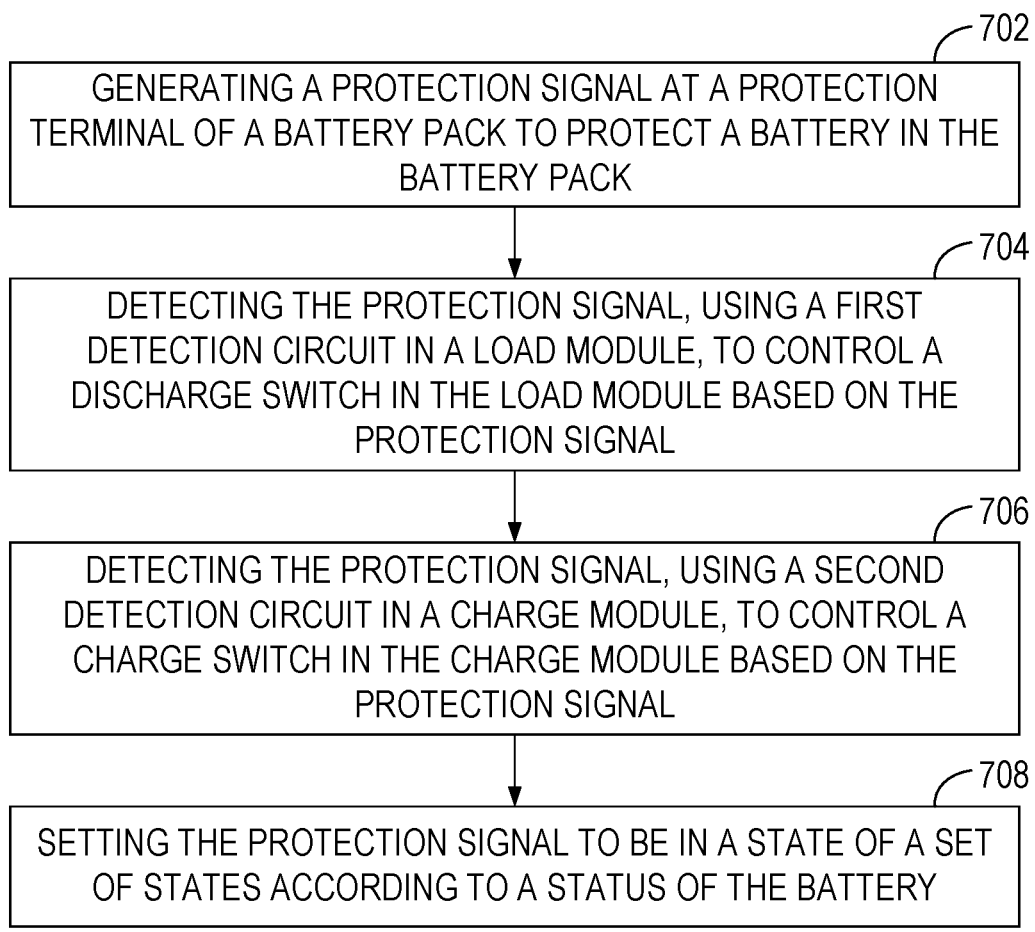
FIG. 7 illustrates an example of a method for protecting a battery pack, in an embodiment of the present invention.

FIG. 7 illustrates an example of a method for protecting a battery pack, in an embodiment of the present invention. Although specific steps are disclosed in FIG. 7, such steps are examples for illustrative purposes. That is, embodiments according to the present invention are well suited to performing various other steps or variations of the steps recited in FIG. 7. FIG. 7 is described in combination with FIG. 2, FIG. 3A, FIG. 3B, FIG. 4A, FIG. 4B, FIG. 5, and FIG. 6.

At step 702, the battery pack 202 (e.g., including the battery pack 202A, 202B, 202C, 202D, 202E, or 202F) generates a protection signal $S_{PR}$ (e.g., including the signal $V_{PR1}$, $V_{PR2}$, $V_{PR3}$, $V_{PR4}$, or $F_{PR}$) at the protection terminal 210 of the battery pack 202.

At step 704, a first detection circuit 224 in the load module 204 (e.g., including the load module 204A, 204B, 204C, 204D, 204E, or 204F) detects the protection signal $S_{PR}$, thereby controlling the discharge switch $Q_{DSG}$ based on the protection signal $S_{PR}$. The discharge switch $Q_{DSG}$ can allow a discharging current of the battery 222 to flow through it to power the load circuit 216.

At step 706, a second detection circuit 226 in the charger module 206 (e.g., including the charger module 206A, 206B, 206C, 206D, 206E, or 206F) detects the protection signal $S_{PR}$, thereby controlling the charge switch $Q_{CHG}$ based on the protection signal $S_{PR}$. The charge switch $Q_{CHG}$ can allow a charging current from the charger circuit 220 to flow through it to charge the battery 222.

At step 708, the protection circuitry 208 in the battery pack 202 sets the protection signal $S_{PR}$ to a state of multiple states according to a status/condition of the battery 222, e.g., including a normal condition, an over-voltage condition, an under-voltage condition, an over-temperature condition, etc. The multiple states include a first state, a second state, a third state, and a fourth state. The protection signal $S_{PR}$ can turn on the charge switch $Q_{CHG}$ and turn off the discharge switch $Q_{DSG}$ if the protection signal is in the first state. The protection signal $S_{PR}$ can turn off the charge switch $Q_{CHG}$ and turn on the discharge switch $Q_{DSG}$ if the protection signal is in the second state. The protection signal $S_{PR}$ can turn off the charge switch $Q_{CHG}$ and the discharge switch $Q_{DSG}$ if the protection signal is in the third state. The protection signal $S_{PR}$ can turn on the charge switch $Q_{CHG}$ and the discharge switch $Q_{DSG}$ if the protection signal is in the fourth state.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

We claim:

1. A portable device comprising:
a load module comprising: a discharge switch configured to allow a discharging current of a battery to flow through said discharge switch to power said load module, and a first detection circuit configured to detect a protection signal, thereby controlling said discharge switch based on said protection signal;
a charge module comprising: a charge switch configured to allow a charging current to flow through said charge switch to charge said battery, and a second detection circuit configured to detect said protection signal, thereby controlling said charge switch based on said protection signal; and
a battery pack coupled to said load module and said charge module, said battery pack comprising said battery and further comprising:
a protection terminal that provides said protection signal to protect said battery; and
protection circuitry, coupled to said protection terminal, that sets said protection signal to a state of a plurality of states according to a status of said battery, thereby controlling said charge switch and said discharge switch, wherein said plurality of states comprise a first state, a second state, a third state, and a fourth state, and wherein:
said protection signal, if in said first state, causes said charge switch to be turned on and said discharge switch to be turned off;
said protection signal, if in said second state, causes said charge switch to be turned off and said discharge switch to be turned on;
said protection signal, if in said third state, causes said charge switch to be turned off and said discharge switch to be turned off; and
said protection signal, if in said fourth state, causes said charge switch to be turned on and said discharge switch to be turned on.

2. The portable device of claim 1, wherein said protection circuitry comprises:
a first resistor coupled to said protection terminal;
a first switch, coupled to said first resistor, that selectively connects said protection terminal to a reference ground through said first resistor;
a second resistor coupled to said protection terminal;
a second switch, coupled to said second resistor, that selectively connects said protection terminal to said reference ground through said second resistor; and
a control circuit, coupled to said first and second switches, that controls said first and second switches according to said status of said battery.

3. The portable device of claim 2, wherein said first resistor and said second resistor have different resistance values, and wherein if said first and second switches are turned on, then said first and second resistors are coupled in parallel.

4. The portable device of claim 3, wherein said protection circuitry comprises: a reference voltage source that applies electric power to said protection terminal, and a third resistor coupled between said reference voltage source and said protection terminal.

5. The portable device of claim 3, wherein said protection circuitry comprises a reference current source that applies electric power to said protection terminal.

6. The portable device of claim 2, wherein said first detection circuit comprises: a first reference power source that applies electric power to said protection terminal, and a first switch control circuit that controls said discharge switch according to said protection signal, and wherein said second detection circuit comprises: a second reference power source that applies electric power to said protection terminal, and a second switch control circuit that controls said charge switch according to said protection signal.

7. The portable device of claim 6, wherein if said portable device is connected to an external power source, then said portable device disables said first reference power source and enables said second reference power source, and wherein if there is no external power source connected to said portable device, then said portable device enables said first reference power source and disables said second reference power source.

8. The portable device of claim 6, wherein said first reference power source comprises a first voltage source coupled to said protection terminal through a third resistor, and wherein said second reference power source comprises a second voltage source coupled to said protection terminal through a fourth resistor.

9. The portable device of claim 6, wherein said first reference power source comprises a first current source, and wherein said second reference power source comprises a second current source.

10. The portable device of claim 2, wherein said first detection circuit comprises: a first resistance detection circuit that detects a resistance at said protection terminal, and a first switch control circuit that controls said discharge switch according to said resistance, and wherein said second detection circuit comprises: a second resistance detection circuit that detects said resistance at said protection terminal, and a second switch control circuit that controls said charge switch according to said resistance.

11. The portable device of claim 1, wherein said protection circuitry comprises a frequency signal generator that generates a frequency signal, and controls said frequency signal to be at a frequency level of a plurality of frequency levels according to said status of said battery, and wherein said protection signal comprises said frequency signal.

12. The portable device of claim 1, wherein if said protection circuitry detects an over-voltage condition in said battery, then said protection circuitry sets said protection signal to a state of said third state and said second state, and wherein if said protection circuitry detects an under-voltage condition in said battery, then said protection circuitry sets said protection signal to a state of said third state and said first state.

13. A battery pack comprising:
a battery configured to power a load module if said battery is coupled to said load module;
a protection terminal configured to provide a protection signal to protect said battery; and protection circuitry, coupled to said battery and said protection terminal, and configured to control said protection signal to a state of a plurality of states according to a status of said battery, wherein if said battery pack is connected to an external power source through a charge module, then said protection signal controls a charge switch, in said charger module, to control charging of said battery, and wherein if there is no external power source connected to said battery pack, then said protection signal controls a discharge switch, in said load module, to control discharging of said battery, wherein said plurality of states comprise a first state, a second state, a third state, and a fourth state, and wherein:

said protection signal, if in said first state, causes said charge switch to be turned on and said discharge switch to be turned off;

said protection signal, if in said second state, causes said charge switch to be turned off and said discharge switch to be turned on;

said protection signal, if in said third state, causes said charge switch to be turned off and said discharge switch to be turned off; and said protection signal, if in said fourth state, causes said charge switch to be turned on and said discharge switch to be turned on.

14. The battery pack of claim 13, wherein said protection circuitry comprises:

a first resistor coupled to said protection terminal;

a first switch, coupled to said first resistor, that selectively connects said protection terminal to a reference ground through said first resistor;

a second resistor coupled to said protection terminal;

a second switch, coupled to said second resistor, that selectively connects said protection terminal to said reference ground through said second resistor; and a control circuit, coupled to said first and second switches, that controls said first and second switches according to said status of said battery.

15. The battery pack of claim 14, wherein said first resistor and said second resistor have different resistance values, and wherein if said first and second switches are turned on, then said first and second resistors are coupled in parallel.

16. The battery pack of claim 15, wherein said protection circuitry comprises: a reference voltage source that applies electric power to said protection terminal, and a third resistor coupled between said reference voltage source and said protection terminal.

17. The battery pack of claim 15, wherein said protection circuitry comprises a reference current source that applies electric power to said protection terminal.

18. The battery pack of claim 13, wherein said protection circuitry comprises a frequency signal generator that generates a frequency signal, and controls said frequency signal to be at a frequency level of a plurality of frequency levels according to said status of said battery, and wherein said protection signal comprises said frequency signal.

19. The battery pack of claim 13, wherein if said protection circuitry detects an over-voltage condition in said battery, then said protection circuitry sets said protection signal to a state selected from said third state and said second state, and wherein if said protection circuitry detects an under-voltage condition in said battery, then said protection circuitry sets said protection signal to a state selected from said third state and said first state.

20. A method comprising:

generating a protection signal at a protection terminal of a battery pack comprising a battery;

detecting said protection signal, using a first detection circuit in a load module, thereby controlling a discharge switch in said load module based on said protection signal, wherein said discharge switch is configured to allow a discharging current of said battery to flow through said discharge switch to power said load module;

detecting said protection signal, using a second detection circuit in a charge module, thereby controlling a charge switch in said charge module based on said protection signal, wherein said charge switch is configured to allow a charging current to flow through said charge switch to charge said battery;

setting said protection signal to a state of a plurality of states according to a status of said battery, said plurality of states comprising a first state, a second state, a third state, and a fourth state;

if said protection signal is in said first state, controlling said charge switch to be on and said discharge switch to be off;

if said protection signal is in said second state, controlling said charge switch to be off and said discharge switch to be on;

if said protection signal is in said third state, controlling said charge switch to be off and said discharge switch to be off; and if said protection signal is in said fourth state, controlling said charge switch to be on and said discharge switch to be on.

* * * * *